United States Patent [19]

Spence

[11] Patent Number: 5,157,551

[45] Date of Patent: Oct. 20, 1992

[54] MIRROR WIPER APPARATUS

[75] Inventor: Jonathan P. Spence, Cavalier, N. Dak.

[73] Assignee: Spenco, Inc., Cavalier, N. Dak.

[21] Appl. No.: 390,164

[22] Filed: Aug. 7, 1989

[51] Int. Cl.$^5$ .................... G02B 7/18; A47L 1/00; B60S 1/02

[52] U.S. Cl. .................... 359/509; 359/507; 15/250.26; 15/250.29

[58] Field of Search ............ 350/588, 252, 600, 606, 350/582-584, 608-639; 15/250 R, 250 B, 250.01-250.42, 256.5, 256.53, 250 A-250 C; 359/838-844, 871-882, 507-514

[56] References Cited

U.S. PATENT DOCUMENTS

| | | | |
|---|---|---|---|
| 1,789,217 | 1/1931 | Cherry | 15/250.26 |
| 2,885,708 | 5/1959 | Presser | 15/250.26 |
| 3,078,494 | 2/1963 | Price | 15/250.17 |
| 3,135,004 | 6/1964 | Naigraw | 350/582 |
| 3,685,087 | 8/1972 | Pittman | 350/582 |
| 3,686,706 | 8/1972 | Finley | 15/250.16 |
| 3,855,661 | 12/1974 | Prince | 15/250.26 |
| 3,940,822 | 3/1976 | Emerick et al. | 350/588 |
| 4,037,286 | 7/1977 | Medearis et al. | 350/582 |
| 4,457,597 | 7/1984 | DeGideo | 350/252 |
| 4,459,718 | 7/1984 | Hewitt et al. | 15/250 B |
| 4,466,712 | 8/1984 | Vitaloni | 350/632 |
| 4,517,704 | 5/1985 | Benson | 15/250. B |
| 4,648,148 | 3/1987 | Egner-Walter et al. | 15/250.23 |
| 4,763,381 | 8/1988 | Williams | 350/582 |
| 4,815,159 | 3/1989 | Köhbach | 15/250.26 |
| 4,873,740 | 10/1989 | Vahrenwald et al. | 15/250.29 |
| 4,936,670 | 6/1990 | Yoo | 350/582 |

FOREIGN PATENT DOCUMENTS

| | | | |
|---|---|---|---|
| 184992 | 8/1987 | Japan | 15/250 B |
| 81149 | 8/1934 | Sweden | 15/250.26 |
| 225463 | 12/1924 | United Kingdom | 15/250.26 |
| 484608 | 5/1938 | United Kingdom | 15/250.26 |
| 2063661 | 6/1981 | United Kingdom . | |
| 2065459 | 7/1981 | United Kingdom . | |

Primary Examiner—Bruce Y. Arnold
Assistant Examiner—Thong Nguyen
Attorney, Agent, or Firm—Robert E. Kleve

[57] ABSTRACT

The invention comprises a rear view mirror having a surrounding frame with a sleeve mounted vertically along one vertical edge of the frame. The sleeve has a slot and a screw is mounted within the sleeve with a pair of spiral grooves of opposite pitch connected together at their upper and lower edges to form an oscillating path. A ring is slidably mounted on the screw with a pin on the ring engaging the screw in one of the grooves. A motor drives the screw to cause the ring to oscillate vertically in the sleeve and a wiper has an arm connected to the ring through the slot in the sleeve, so that the oscillation of the ring on the screw causes the wiper to oscillate upward and downward on the mirror to wipe the mirror to remove rainfall.

3 Claims, 2 Drawing Sheets

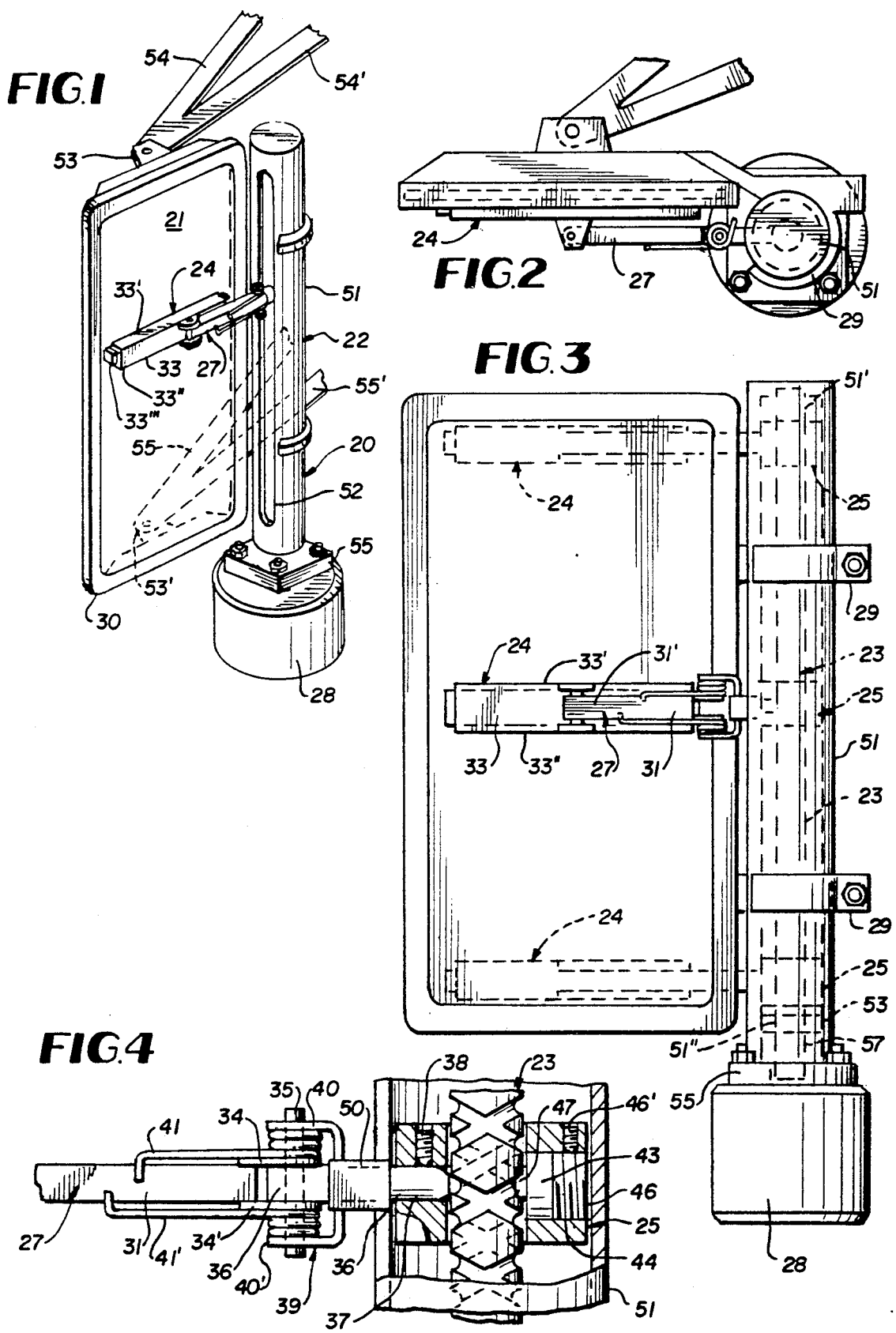

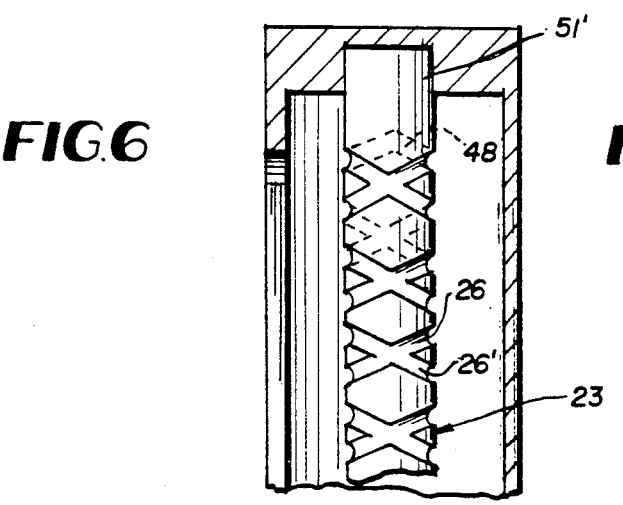
FIG.6
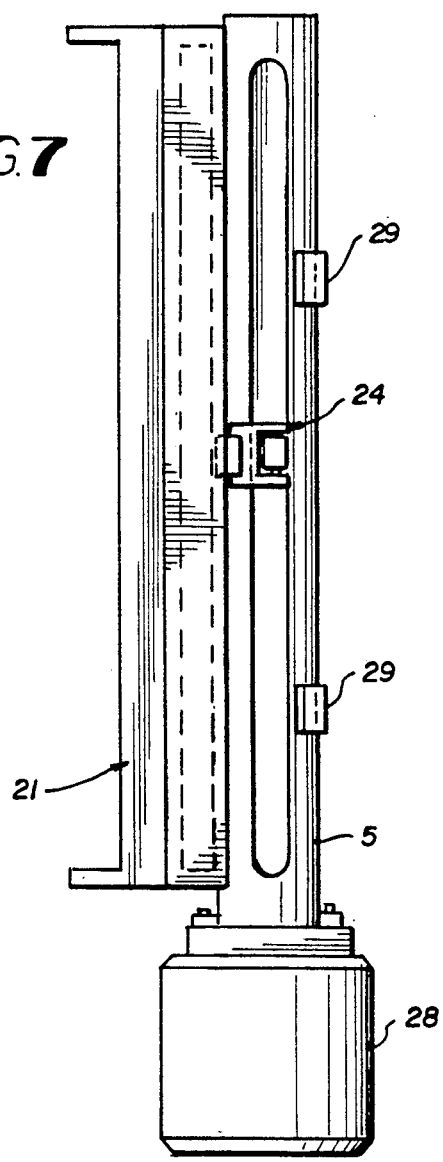
FIG.7
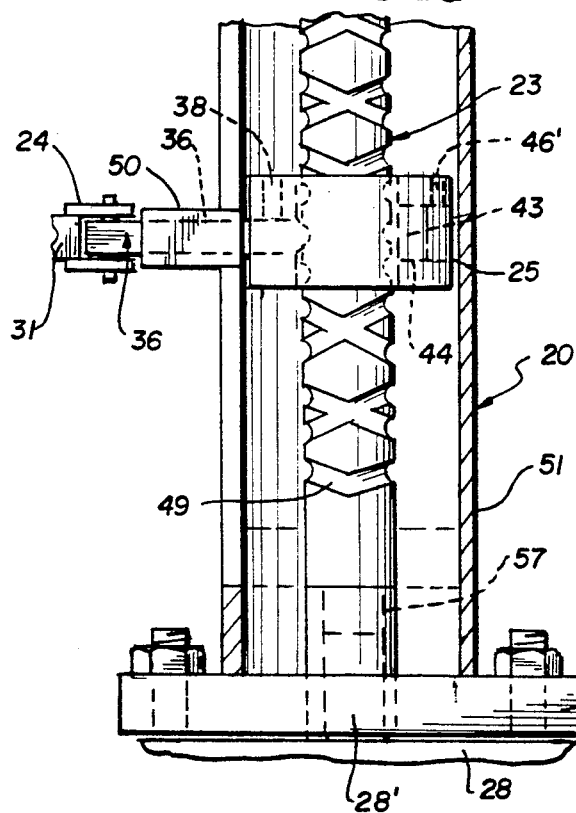
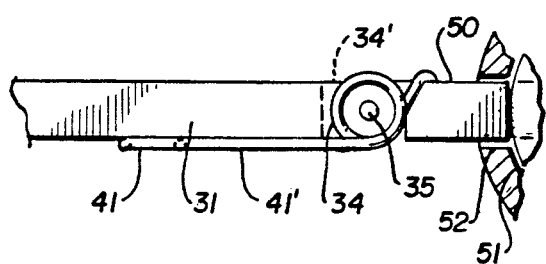
FIG.5
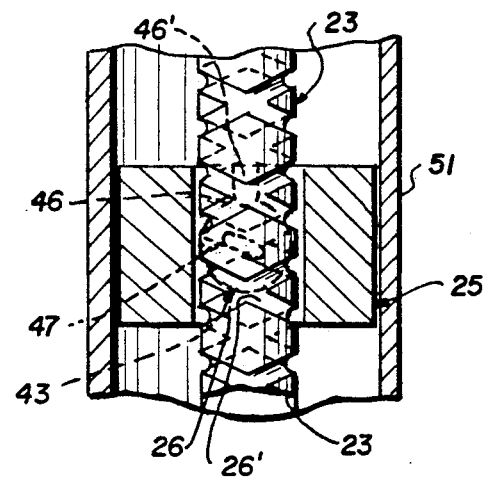
FIG.8

MIRROR WIPER APPARATUS

BACKGROUND OF THE INVENTION

The invention relates to rear view mirror apparatus. More particularly, the invention relates to rear view mirror apparatus having power driven wipers for automatically wiping the surfaces of the mirror.

It is an object of the invention to provide a novel, inexpensive, mirror wiper apparatus which is compact and power driven to wipe the mirror surface when wet.

It is a further object of the invention to provide a novel rear view mirror apparatus having a compact, power driven, rear view mirror wiper apparatus which operates with a minimum of mechanism.

Further objects and advantages of the invention will become apparent as the description proceeds and when taken in conjunction with the accompanying drawings wherein:

BRIEF DESCRIPTION OF THE DRAWINGS

FIG. 1 is a perspective view of the rear view mirror power drive wiper apparatus.

FIG. 2 is a top plan view of the invention.

FIG. 3 is a side elevational view of the rear view mirror power driven wiper apparatus.

FIG. 4 is a fragmentary enlarged side cutaway view of the wiper connection to the raising and lowering mechanism.

FIG. 5 is a fragmentary enlarged top cutaway view of the wiper connection to the raising and lowering mechanism.

FIG. 6 is a fragmentary enlarged side elevational cutaway view of the screw mechanism.

FIG. 7 is an end view of the invention.

FIG. 8 is a cutaway view similar to FIG. 4 at 90 degrees therefrom about a vertical axis.

DESCRIPTION OF THE EMBODIMENT

Briefly stated, the invention comprises a rear view mirror apparatus having a power driven mirror surface wiper movable vertically along the mirror surface for wiping the mirror. A vertical screw mechanism is mounted along one vertical lateral edge of the mirror and is power driven and the wiper has a ring connection with the screw of the screw mechanism and the screw has a double spiral groove for moving the ring connection and wiper vertically in an oscillating path.

Referring more particularly to the drawings, in FIGS. 1 and 3, the power driven mirror wiper apparatus 20 is illustrated having a mirror 21 with a frame 30 surrounding the mirror and with a power driven mirror wiper mechanism 22 mounted to the frame along one lateral vertical edge of the frame and mirror. The apparatus is mounted to either the left or right side of a truck, although the apparatus is illustrated for the left side of a truck, the construction may be reversed and used for the right side of a truck where it is not convenient for the driver to wipe the mirror.

The mirror wiper mechanism 22 has a screw 23 for raising and lowering a wiper 24. A cylindrical housing 51 surrounds a vertical screw 23 and a ring 25 is slidably mounted to the screw 23. The screw 23 has dual reversely pitched grooves 26 and 26' spiraling along the screw in opposition to one another. The ring 25 has a rotary plug 43 with a projecting rib 47 that engages one of the grooves for raising and lowering the ring and thereby the wiper 24, through an arm connection 27 between the wiper 24 and ring 25. The cylindrical housing 51 has flanges 29 bolted to the edge of the frame 30. A motor 28 is mounted to the bottom flange 55 of the housing 51 and an output shaft 28' has a toothed coupling 57 which fixes the shaft to the screw 23. Driving the motor 28 turns the output shaft which rotates the screw 23 driving the ring 25 on the screw upward to drive the wiper upward until the ring reaches the top of the screw in one spiral groove 26 and goes down the reversely pitched groove 26' to the bottom of the screw 23 and the operation repeats for a thereby vertical oscillating movement for the ring, wiper mechanism and wiper for wiping the mirror.

The wiper arm 31 has a U shaped channel 33 and the wiper 24 mounted to the end 31' of the wiper arm 31. The U shaped channel has sides 33' and 33" frictionally engaging against the rubber or resilient strip 33'" of the wiper to retain the resilient strip 33'" in the channel 33.

The other end of the arm 31 has flanges 34 and 34' fixed thereto. A pin 35 passes through the flanges in pivotal relation and the pin is fixed to a cylindrical rod 36. The pivotal connection of the flanges 34 and 34' pivotally mounts the arm 31 and thereby the wiper 24 to the rod. The rod 36 at its other end is mounted in a bore 37 in the ring 25 and a set screw 38 is threaded into the ring or carriage 25 against the rod 36 to fix the rod 36 to the ring.

A double torsion spring 39 has a double coil 40 and 40' wound about the pin 35 at opposite ends of the pin, and the outer ends 41 and 41' of the spring are bent laterally and engage against the arm 31 to urge the arm 31 and wiper 24, attached thereto, clockwise, when viewed from FIGS. 2 and 5, to thereby urge the wiper 24 against the surface of the mirror 21 so as to continuously engage the wiper 24 against the mirror when wiping the mirror with the wiper 24.

The ring or carriage 25 has a rotary plug 43 rotatably mounted in a bore 44 in the ring 25. A threaded screw 46 is threaded into the outer portions of the bore 44 to hold the plug 43 in the bore. A set screw 46' is threaded into the ring 25 laterally against the screw 46 to retain the screw 46 in the plug.

The inner surface of the plug 43 has an elongated rib 47 fixed thereto and projecting outward therefrom and the screw has the opposing diagonal grooves 26 and 26' which spiral in opposite direction to one another on the screw; and when the ring 25 is slid over the screw and the plug 43 is inserted into the bore of the ring and retained thereto by the screw and set screw, the rib 47 will engage one of the grooves 26 and 26'.

OPERATION

Energizing the motor 28 turns the output shaft which rotates the screw 23 driving the ring 25 on the screw upward, driving the arm and wiper 24 upward.

When the rib 47 of the ring 25 engages in the groove 26, as illustrated in FIG. 8, the rotation of the screw 23 clockwise, when viewed from FIG. 2, will cause the rib 47 to travel upward in the groove 26, following the groove 26 to the top of the screw which causes the wiper 24 to move upward to the top of the mirror at the same time. When the rib 47 reaches the upper end of the spiral 26 of the screw 26, it will travel into the connecting groove 48 of the screw to groove 26' whereupon, the continued rotation of the screw 23 in the same direction will cause the rib 47 of the ring to follow groove 26' and travel downward in the groove 26' thereby causing the ring 25 and wiper 24 to travel or move downward, with the rubber strip of the wiper moving downward, also, along the mirror surface toward the bottom of the mirror.

When the ring 25 reaches the bottom of the screw 23, so as to place the rubber strip of the wiper near the bottom of the mirror, as illustrated in dashed lines in FIG. 3, the rib 47 of the ring travels into the connecting groove 49 between grooves 26 and 26', and the continued rotation of the screw 23 in the same direction will cause the rib 47 and ring to again move upward in the groove 26 moving the ring, wiper 24 and its rubber strip upward to move the wiper's rubber strip upward along and against the mirror surface.

When the rib 47 of the ring 25 reaches the upper end of the screw, it travels into again the connecting groove 48 and the operation repeats itself to oscillate the ring up and down along the screw and thereby oscillate the wiper's rubber strip upward and downward along the mirror surface for wiping the mirror, with the wiper's rubber strip traveling from its upper position shown in dashed lines to its lower position shown in dashed lines in FIG. 3 in the oscillating operation.

A cylindrical sleeve 50 is rotatably mounted on a cylindrical portion of the rod 31 of the wiper arm 27 where the rod 31 extends through a vertical slot 52 in the cylindrical housing 51. The cylindrical housing 51 houses the screw 23 and has a bore 51' in its upper end for rotatably supporting the upper end of the screw 23 and a bore 51'' in a brace 53 across the lower end of the housing 51 for rotatably supporting the lower end of the screw 23. The cylindrical sleeve may rotatably engage the cylindrical housing along one edge of the slot 52; although the slot 52 in the housing is larger in its width than the rod 31. Normally, the sleeve and edges of the slot would not contact one another; however, in the event they do, the sleeve provides a rolling contact between the two components so that there is less friction between the two.

The mirror 21 has a metal flange 30 which surrounds the mirror. A pair of flanges 53 and 53' are fixed to the top and bottom of the metal flange 30 near the top and bottom of the mirror. A pair of posts 54 and 54' at the upper edge of the mirror and a pair of posts 55 and 55' at the lower edge of the mirror have their one ends converging in upper and lower pairs and are rotatably mounted to the upper and lower flanges 53 and 53' fixed to the mirror. The other ends of the posts 54 and 54' and 55 and 55' are fixed to the side of the truck to provide a pivotal mounting for the mirror with respect to the side of the truck. The posts will normally be mounted to the truck near the right or left front side of the truck in a conventional manner.

As it is apparent from the drawings, the sleeve or housing 51 has its front and rear surfaces at least near the front and rear surfaces of the mirror 21 and its frame 30; and the sleeve 51 has a width at least several times smaller than the width of the mirror 21 and frame from one side edge of the mirror 21 and frame 30 to the other side edge of the mirror and frame and surrounds the screw 23 in close proximity.

As it can further be seen from the drawings, the ring member 25 is of marginal height several times smaller than the height of the mirror 21 and sleeve 51; and the mirror 21 and sleeve 51 are of substantially the same height to one another.

Thus, it will be seen that a novel mirror wiper apparatus has been provided having a narrow compact construction for less air resistance and for less expensive manufacture of the apparatus.

It will be obvious that various changes and departures may be made to the invention without departing from the spirit and scope thereof; and accordingly, it is not intended that the invention be limited to that specifically described in the specification or as illustrated in the drawings, but only as set forth in the appended claims.

What is claimed is:

1. A rear view mirror wiper device for attachment to a vehicle comprising: a vertical rectangular flat mirror with a rectangular vertical elongated frame surrounding said mirror on its side edges, said mirror having a rear reflecting face and a front face; an upright vertical sleeve fixed to one vertical side edge of the frame; supporting arms; pivotal support means on the upper and lower edges of the frame intermediate between the side edges of the mirror and frame for pivotally mounting said frame to the supporting arms with the supporting arms being adapted to be secured to the side of a vehicle; said mirror and its frame having outer surfaces having a horizontal longitudinal front to rear thickness several times smaller than its lateral side edge to side edge horizontal width, said sleeve having outer surfaces having its longitudinal front to rear thickness at least near the longitudinal front to rear thickness of the mirror and frame, said sleeve outer surfaces having a lateral side edge to side edge horizontal width several times smaller than the lateral side edge to side edge horizontal width of the mirror and frame; a vertical elongated screw rotatable in said sleeve; said sleeve surrounding said screw in close proximity; said screw having upward and downward spiral grooves of opposing pitch to one another and connected together at their tops and bottoms by connecting grooves; a ring member ringing the screw with a pin in said ring member engaging one of the grooves; said sleeve having a vertical slot; a horizontal arms means mounted at its one end to said ring member and extending horizontally outward through the slot and across the rear reflecting surface of the mirror; a horizontal wiper blade pivotally mounted to the outer other end of the arm means and extending horizontally across the rear face of the mirror; motor means mounted to one end of the screw for rotating the screw about its vertical axis, whereby the rotation of the screw causes the pin, ring member, arm means, and blade to move upward in one groove of the spiral grooves and across to the upper connecting groove and travel down the other of the spiral grooves and across to the lower connecting groove to said one groove to repeat in a vertical oscillating movement with the wiper blade acting to engage and wipe the rear reflecting surface of the mirror.

2. A rear view mirror wiper device according to claim 1, wherein said ring member is slidable within the sleeve and is of marginal height several times smaller than the height of the mirror and sleeve, and said sleeve is at least of the same height as the mirror whereby the ring member may move within the sleeve from a position near the bottom of the mirror to a position near the top of the mirror while within the confines of the sleeve and return in response to the rotation of the screw by the motor means.

3. A rear view mirror wiper device for attachment to a vehicle comprising: a vertical rectangular flat mirror with a rectangular vertically elongated frame surrounding said mirror on its side edges, said mirror having a rear reflecting surface and a front surface; an upright vertical sleeve fixed to one vertical side edge of the frame; supporting arms; pivotal support means on the upper and lower edges of the frame centrally between the side edges of the mirror and frame for pivotally mounting said frame to the supporting arms with the supporting arms being adapted to be secured to the side of a vehicle; said sleeve having front and rear surfaces at least near the front and rear surfaces of the mirror and its frame; a vertical elongated screw rotatable in said sleeve; said sleeve having a width at least several times smaller than the width of the mirror from one side edge of the mirror and frame to the other side edge of the mirror and frame and surrounding the screw in close proximity; said screw having upward and downward spiral grooves of opposing pitch to one another and connected together at their tops and bottoms by connecting grooves; a ring member ringing the screw with a pin in said ring member engaging one of the grooves; said sleeve having a vertical slot; a horizontal arms means mounted at its one end to said ring member and extending horizontally outward through said slot and across the rear reflecting surface of the mirror; a horizontal wiper blade pivotally mounted to the outer other end of the arm means and extending horizontally across the rear face of the mirror; motor means mounted to one end of the screw for rotating the screw about its vertical axis, whereby the rotation of the screw causes the pin, ring member, arm means, and blade to move upward in one groove of the spiral grooves and across to the upper connecting groove to the other opposing spiral groove and travel down the other of the spiral grooves and across to the lower connecting groove to said one groove to repeat in a vertical oscillating movement with the wiper blade acting to engage and wipe the rear reflecting surface of the mirror; said ring member being slidable with said sleeve and of marginal height several times smaller than the height of the mirror and sleeve, said mirror and sleeve being of substantially the same height to one another whereby the ring member may move within the sleeve from a position near the bottom of the mirror to a position near the top of the mirror while within the confines of the sleeve and return in response to the rotation of the screw by the motor means.

* * * * *